US009703656B2

(12) United States Patent
Wang et al.

(10) Patent No.: US 9,703,656 B2
(45) Date of Patent: Jul. 11, 2017

(54) METHOD OF STARTING UP DEVICE, DEVICE AND COMPUTER READABLE MEDIUM

(71) Applicant: HISENSE MOBILE COMMUNICATIONS TECHNOLOGY CO., LTD., Qingdao (CN)

(72) Inventors: Pengcheng Wang, Qingdao (CN); Qiaoli Yao, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 88 days.

(21) Appl. No.: 14/707,668

(22) Filed: May 8, 2015

(65) Prior Publication Data
US 2016/0004614 A1    Jan. 7, 2016

(30) Foreign Application Priority Data
Jul. 2, 2014    (CN) .......................... 2014 1 0311909

(51) Int. Cl.
G06F 11/00       (2006.01)
G06F 11/20       (2006.01)
G06F 11/14       (2006.01)

(52) U.S. Cl.
CPC ...... *G06F 11/2094* (2013.01); *G06F 11/1417* (2013.01)

(58) Field of Classification Search
CPC ............ G06F 11/0793; G06F 11/1451; G06F 3/0632; G06F 11/076; G06F 11/1469;
(Continued)

(56) References Cited

U.S. PATENT DOCUMENTS 5,592,596 A * 1/1997 Balsom ................. B41J 3/4071
                                                         358/1.18
5,878,210 A * 3/1999 Kong .................... G06F 21/575
                                                         713/164

(Continued)

FOREIGN PATENT DOCUMENTS

CN        101216772 A        7/2008
CN        101650662 A        2/2010

*Primary Examiner* — Loan L. T. Truong
(74) *Attorney, Agent, or Firm* — Harness, Dickey & Pierce, P.L.C.

(57) ABSTRACT

The embodiments herein relate to the field of computer technology, and specifically relate to a method of starting up a device, a device and a computer readable medium. Some embodiments disclosed herein provide a method of starting up a device, including: when starting up the device, determining whether the triggering condition of integrity check is met; if the triggering condition is met, conducting integrity check for main partition information; after confirming that the main partition information is lack of integrity, conducting integrity check for backup partition information; and after confirming that the backup partition information is of integrity, starting up the device using the backup partition information, and restoring the main partition information using the backup partition information. Some embodiments herein disclose a method of restoring main partition information of a device, which may ensure the integrity of the main partition information, and may enhance the performance of the device.

18 Claims, 4 Drawing Sheets

(58) Field of Classification Search
CPC ... G06F 11/2094; G06F 11/1117; G06F 3/0619; G06F 3/0653; G06F 17/30371
See application file for complete search history.

(56) References Cited

U.S. PATENT DOCUMENTS

| | | | | |
|---|---|---|---|---|
| 6,470,446 B1* | 10/2002 | Beelitz | G06F 8/61 | 713/2 |
| 6,701,332 B1* | 3/2004 | Vella | G06F 3/0607 | |
| 7,890,793 B1* | 2/2011 | Mohl | G06F 11/1435 | 714/3 |
| 7,987,383 B1* | 7/2011 | Coatney | G06F 11/006 | 709/226 |
| 7,996,497 B2* | 8/2011 | Jones | G06F 11/006 | 709/220 |
| 8,006,125 B1* | 8/2011 | Meng | G06F 11/1417 | 714/6.2 |
| 8,392,762 B2* | 3/2013 | Aralakuppe Ramegowda | G06F 11/1004 | 713/1 |
| 8,438,423 B1* | 5/2013 | Barkelew | G06F 11/1417 | 713/2 |
| 8,595,595 B1* | 11/2013 | Greanac | G06F 11/1092 | 714/6.2 |
| 8,954,791 B2* | 2/2015 | Kataria | G06F 11/2084 | 714/6.13 |
| 9,329,931 B2* | 5/2016 | Canepa | G06F 11/1008 | |
| 2002/0111133 A1* | 8/2002 | Wittkotter | G06F 21/6218 | 455/1 |
| 2002/0152370 A1* | 10/2002 | Wada | G06F 9/4406 | 713/1 |
| 2003/0191930 A1* | 10/2003 | Viljoen | G06F 8/65 | 713/1 |
| 2003/0214754 A1* | 11/2003 | Hanakawa | G11B 23/0308 | 360/133 |
| 2003/0229819 A1* | 12/2003 | Kodama | G06F 11/1417 | 714/5.11 |
| 2004/0059817 A1* | 3/2004 | Ueno | H04L 12/2803 | 709/224 |
| 2004/0117414 A1* | 6/2004 | Braun | G06F 8/65 | |
| 2006/0075217 A1* | 4/2006 | Takamoto | G06F 9/4416 | 713/2 |
| 2006/0107103 A1* | 5/2006 | Rodrigues | G06F 11/1096 | 714/6.1 |
| 2006/0149892 A1* | 7/2006 | McFarling | G06F 12/08 | 711/103 |
| 2007/0011674 A1* | 1/2007 | Joo | G06F 9/4406 | 717/174 |
| 2007/0260912 A1* | 11/2007 | Hatasaki | G06F 9/4406 | 714/4.4 |
| 2008/0005462 A1* | 1/2008 | Pyeon | G06F 3/061 | 711/113 |
| 2008/0005527 A1* | 1/2008 | Bang | G06F 9/441 | 711/202 |
| 2008/0028052 A1* | 1/2008 | Currid | G06F 9/4416 | 709/222 |
| 2008/0209553 A1* | 8/2008 | Lu | G06F 12/1433 | 726/22 |
| 2009/0125645 A1 | 5/2009 | Prevost et al. | | |
| 2009/0199048 A1* | 8/2009 | Aralakuppe Ramegowda | G06F 11/1004 | 714/54 |
| 2009/0217024 A1* | 8/2009 | Childs | G06F 11/1417 | 713/2 |
| 2010/0065634 A1* | 3/2010 | Nakamura | G06Q 30/0603 | 235/385 |
| 2010/0275251 A1* | 10/2010 | Gross | H04L 63/062 | 726/6 |
| 2011/0147447 A1* | 6/2011 | Bandholz | G06F 9/4403 | 235/375 |
| 2012/0079474 A1* | 3/2012 | Gold | G06F 8/65 | 717/173 |
| 2012/0284451 A1* | 11/2012 | Yang | G06F 3/0605 | 711/103 |
| 2013/0138941 A1* | 5/2013 | Park | G06F 9/4401 | 713/2 |
| 2014/0059313 A1* | 2/2014 | Hwang | G06F 11/1435 | 711/162 |
| 2014/0325203 A1* | 10/2014 | Roche | G06F 11/1417 | 713/2 |
| 2014/0365724 A1* | 12/2014 | Zhou | G06F 3/0604 | 711/112 |
| 2016/0246681 A1* | 8/2016 | Tsirkin | G06F 11/1451 | |
| 2017/0091052 A1* | 3/2017 | Gao | G06F 11/1662 | |

* cited by examiner

… (1) …

METHOD OF STARTING UP DEVICE, DEVICE AND COMPUTER READABLE MEDIUM

CROSS REFERENCE TO RELATED APPLICATION

This application claims the benefit and priority of Chinese Patent Application No. 201410311909.9 filed Jul. 2, 2014. The entire disclosure of the above application is incorporated herein by reference.

FIELD

The present disclosure relates to the field of computer technology, and specifically relate to a method of starting up a device, a device, and computer readable medium.

BACKGROUND

This section provides background information related to the present disclosure which is not necessarily prior art.

The partition table of a storage device contains the partition information of the storage device. When the partition table is damaged, the system could not find the partition and the data therein within the storage device, which causes much inconvenience to the users.

SUMMARY

This section provides a general summary of the disclosure, and is not a comprehensive disclosure of its full scope or all of its features.

The embodiments disclosed herein provide a method of starting up a device, a device, and a computer readable medium, which may be used to solve the problem in current state of art that it is impossible to retrieve partition and the data therein of the storage device once the partition table of the storage device is damaged.

Some embodiments disclosed herein provide a method of starting up a device, including:

when starting up the device, determining whether the triggering condition of integrity check is met;

if the triggering condition is met, conducting integrity check for the main partition information;

after confirming that the main partition information is lack of integrity, conducting integrity check for the backup partition information; and after confirming that the backup partition information is of integrity, starting up the device using the backup partition information, and restoring the main partition information using the backup partition information.

Some embodiments disclosed herein provide a device, including:

one or more processors; and a storage device.

The storage device stores one or more computer readable program codes, and the processors are used to execute the computer readable program codes, to perform the following:

when starting up the device, determining whether the triggering condition of integrity check is met;

if the triggering condition is met, conducting integrity check for the main partition information;

after confirming that the main partition information is lack of integrity, conducting integrity check for the backup partition information; and after confirming that the backup partition information is of integrity, starting up the device using the backup partition information, and restoring the main partition information using the backup partition information.

The computer readable storage medium provided herein may store one or more programs. The programs may be executed by a device to perform the following:

when starting up the device, determining whether the triggering condition of integrity check is met;

if the triggering condition is met, conducting integrity check for the main partition information;

after confirming that the main partition information is lack of integrity, conducting integrity check for the backup partition information; and after confirming that the backup partition information is of integrity, starting up the device using the backup partition information, and restoring the main partition information using the backup partition information.

Some embodiments herein disclose a method of restoring the main partition information of a device, which may ensure the data integrity of the main partition information, and may enhance the performance of the device.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
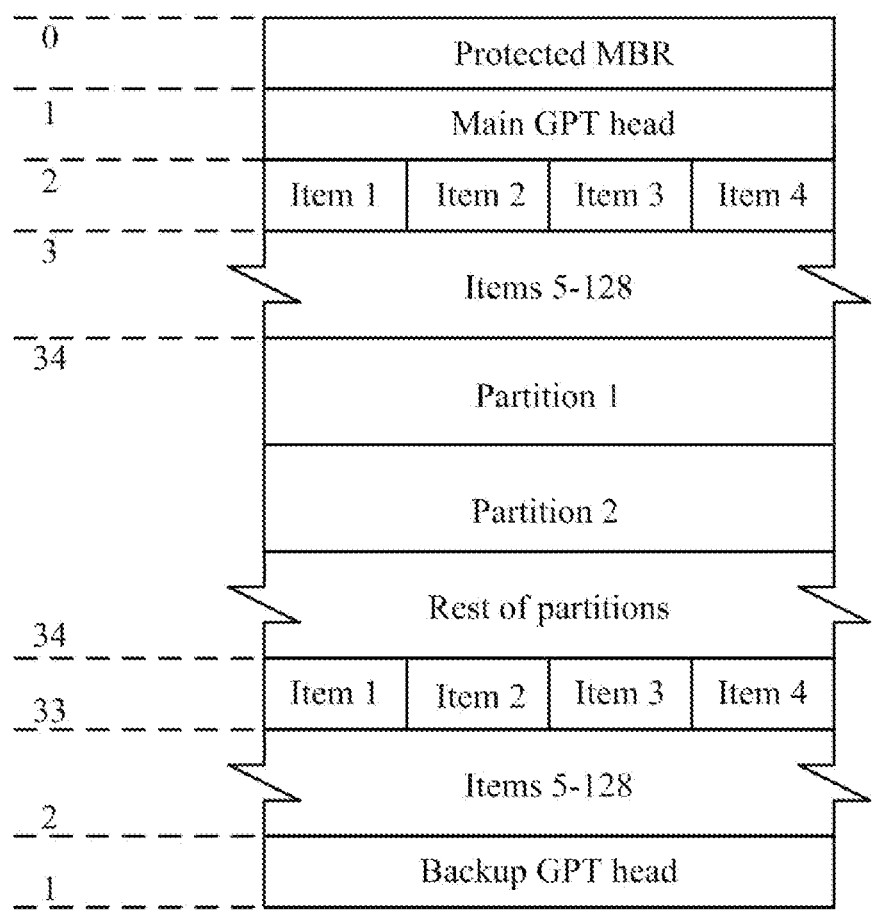
FIG. 1 is a structural diagram of GPT partition table.

GPT (Globally Unique Identifier Partition Table Format) derives from EFI (External Functional Interface) standard, and is a relatively new standard for the structure of disk partition table. FIG. 1 shows the structure of a GPT disk. As shown, the front 34 sectors of the disk store the GPT main partition table, the first sector of which stores traditional MBR (Master Boot Record) information. The second sector is used to store GPT head (location information of the partition table). Subsequent sectors begin to store partition table items. Each of the partition table items defines a partition, including the starting location of the partition, the size of the partition, and other information. The size of each item is fixed to 128 bytes. The $35^{th}$ sector is the first partition of the disc, and the $34^{th}$ sector counting backwards is the last partition of the disk. During its design, a GPT disk uses its last 33 sectors to store a backup partition table. The format of the backup partition table is similar to that of the main partition table, with only one difference that the locations of the GPT head and the partition table items are in the opposite.

Comparing to Master Boot Record (MBR) partition scheme that is currently in wide use, GPT offers a more flexible disk partition mechanism. GPT supports large volume disk exceeding 2 TB, and almost does not impose restrictions on the number of partitions and the sizes thereof. In addition, its partition table comes with backup, and each partition may have a name (which is different from its volume label).

The embodiments disclosed herein do not impose any restrictions to the structure of disk partition table. For illustration, the following explains some of the embodiments using GPT disk partition table.

Some embodiments disclose the following:

When starting up the device, determine whether the triggering condition of integrity check is met;

If the triggering condition is met, conduct integrity check for the main partition information;

After confirming that main partition information is lack of integrity, conduct integrity check for the backup partition information;

After confirming the integrity of the backup partition information, start up the device using the backup partition information, and restore the main partition information using the backup partition information.

Some embodiments herein disclose a method to restore the main partition information of a device, which may ensure the data integrity of the main partition information, and may enhance the performance of the device.

In some embodiments, the device disclosed herein may be computer, cellphone or tablet PC, etc.

In one embodiment, after completing integrity check for the main partition information, the method further includes:

After confirming that the main partition information is of integrity, conduct integrity check for the backup partition information;

After confirming the backup partition information is lack of integrity, start up the device using the main partition information, and restore the backup partition information using the main partition information.

Some embodiments herein disclose a method to restore the backup partition information of a device, which may ensure the integrity of the backup partition information, and may enhance the performance of the device.

In one embodiment, when one of the following conditions is satisfied, the triggering condition for integrity check is considered to be met:

Number of the times of device starting up reaches a preset threshold;

A command to perform integrity check is received.

In one embodiment, during device starting up, before determining whether the triggering condition for integrity check is met, the method further includes the following:

Determining the device does not contain a start up label;

Said start up label indicates the first time to start up the device after a system is newly installed in the device.

In one embodiment, the method to start up the device further includes:

If the device contains the start up label, starting up the device using said main partition information, and deleting the start up label.

In one embodiment, the method to start up the device further includes:

If the device contains the start up label, starting up the device using said main partition information, generating backup partition information using the main partition information, and deleting the start up label.

In one embodiment, the method to start up the device further includes:

When generating or updating the main partition information, adding the start up label to the device.

In one embodiment, during the first time to start up the device after a system is newly installed, backup partition information is generated using the main partition information. The backup partition information may be used subsequently to restore the main partition information, and the main partition information may be used subsequently to restore the backup partition information, therefore to substantially ensure the integrity of the main partition information and the backup partition information.

In one embodiment, when performing integrity check of the main partition information, it includes:

Comparing the first to-be-verified information determined from the main partition information to the stored first verified information in correspondence to the main partition information; and If the first to-be-verified information matches the first verified information, confirming that the main partition information is of integrity; if the first to-be-verified information does not match the first verified information, confirming the main partition information is lack of integrity.

Said first verified information in correspondence to the main partition information is stored when said main partition information is generated;

When performing check for data integrity of the backup partition information, it includes:

Comparing the second to-be-verified information determined from the backup partition information to the stored second verified information in correspondence to the backup partition information; and If the second to-be-verified information matches the second verified information, confirming that the backup partition information is of integrity; if the second to-be-verified information does not match the second verified information, confirming the backup partition information is lack of integrity.

Said second verified information in correspondence to the backup partition information is stored when said backup partition information is generated.

Some embodiments herein provide devices to perform a method to check data integrity of main and backup partition information, which substantially ease the operations to restore between main and backup partition information. Some embodiments herein provide devices to perform a method to restore main and backup partition information, which ensure data integrity of main and backup partition information, and enhance device performance.

The following illustrates an embodiment using the figures.

Figure 2:
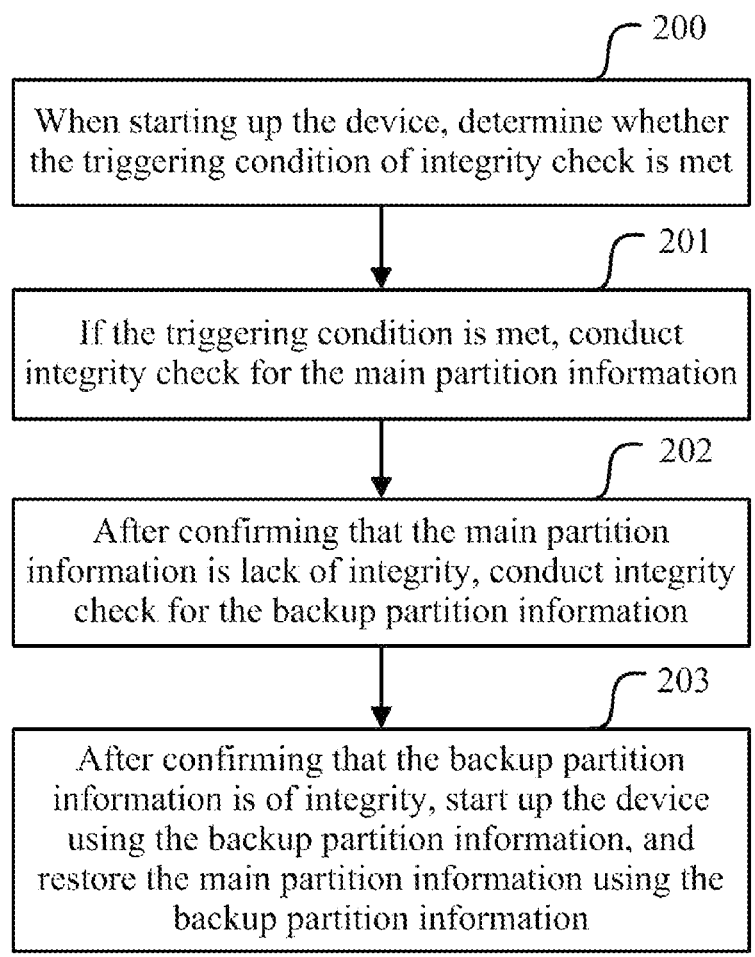
FIG. 2 is a flow chart of a method of starting up a device according to an embodiment.

As shown in FIG. 2, in one embodiment a method of starting up a device includes:

Operation 200, when starting up the device, determine whether the triggering condition of integrity check is met;

Operation 201, if the triggering condition is met, conduct integrity check for the main partition information;

Operation 202: after confirming that the main partition information is lack of integrity, conduct integrity check for the backup partition information;

Operation 203: after confirming that the backup partition information is of integrity, start up the device using the backup partition information, and restore the main partition information using the backup partition information.

In other embodiments, the sequence of restoring the main partition information using the backup partition information and starting up the device using the backup partition information is not in a timely sequence. Some embodiments restore the main partition information using the backup partition information first, and then start up the device using the backup partition information. Some embodiments start up the device using the backup partition information first, and then restore the main partition information using the backup partition information. And some embodiments conduct both at the same time.

After Operation 201, after confirming said main partition information is of integrity, it can also perform check for data integrity of the backup partition information. After confirming the backup partition information is lack of integrity, start up the device using the main partition information, and restore the backup partition information using the main partition information.

In other embodiments, the sequence of restoring the backup partition information using the main partition information and starting up the device using the main partition information is not in a timely sequence. Some embodiments restore the backup partition information using the main partition information first, and then start up the device using the main partition information. Some embodiments start up the device using the main partition information first, and then restore the backup partition information using the main partition information. And some embodiments conduct both at the same time.

In Operation 200, when one of the following conditions is satisfied, the triggering condition for integrity check is considered to be met:

Number of the times of device starting up reaches a preset threshold;

A command to perform integrity check is received.

If the triggering condition for integrity check is that the number of the times of device starting up which reaches the preset threshold, it may use one of the following modes:

Mode 1: reset the threshold to zero after the threshold is reached;

Mode 2: reset threshold to zero after a system is newly installed;

Mode 3: do not reset the threshold to zero, but increase the value of the threshold progressively.

For example, when setting 100 time device starting up as the threshold, and when the number of times of device starting up reaches 100, the integrity check is triggered. At this time, it doesn't reset the threshold to zero, but increase the value of the threshold to 200. When the number of times of device start up reaches 200, the integrity check is triggered. At this time, it doesn't reset the threshold to zero, but increase the threshold to 300, and so on and so forth.

In another embodiment, when setting 100 time device starting up as the threshold, and when the number of times of device starting up currently is 99, in next device starting up, the integrity check is triggered to: first conduct integrity check for the main partition information, and confirm that the main partition information is of integrity; then to conduct integrity check for the backup partition information, and confirm that the backup partition information is also of integrity. Then the device starts up using the main partition information.

In another embodiment, when starting up, the device receives a command to perform integrity check, which triggers the integrity check: first to conduct integrity check for the main partition information, and confirm that the main partition information is lack of integrity; then to conduct integrity check for the backup partition information, and confirm that the backup partition information is lack of integrity as well. Then the device cannot start up normally, and the user is notified to perform an update operation.

In another embodiment, when setting 100 time device starting up as the threshold, and when the device starting up time currently is 99. In next device starting up, the integrity check is triggered: first to conduct integrity check for the main partition information, and confirm that the main partition information is of integrity; then to conduct integrity check for the backup partition information, and confirm that the backup partition information is lack of integrity. Then the backup partition information is restored using the main partition information, and then the device starts up using the main partition information.

In another embodiment, when the device is starting up, it receives a command to perform integrity check, which triggers integrity check performance: first to conduct integrity check for the main partition information, and confirm that the main partition information is lack of integrity; then to conduct integrity check for the backup partition information, and confirm that the backup partition information is of integrity. Then the main partition information is restored using the backup partition information, and then the device starts up using the backup partition information.

In one embodiment, the operation of conducting integrity check for the main partition information includes:

comparing the first to-be-verified information determined from the main partition information to the stored first verified information in correspondence to the main partition information; and if the first to-be-verified information matches the first verified information, confirming the main partition information is of integrity; if the first to-be-verified information does not match the first verified information, confirming that the main partition information is lack of integrity.

The first verified information in correspondence to the main partition information is stored when said main partition information is generated;

The operation of conducting integrity check for the backup partition information includes:

comparing the second to-be-verified information determined from the backup partition information to the stored second verified information in correspondence to the backup partition information; and if the second to-be-verified information matches the second verified information, confirming that the backup partition information is of integrity; if the second to-be-verified information does not match the second verified information, confirming that the backup partition information is lack of integrity.

The second verified information in correspondence to the backup partition information is stored when said backup partition information is generated.

The method of determining the first and second to-be-verified information in the method of checking integrity of main and backup partition information includes but is not limited to the following ways: the simplest check, even-odd check, CRC (Cyclical Redundancy Check), MD (Message Digest) 5 check, etc.

For example, when the device leaves factory and generates the main partition information, it generates its first verified information from its main partition information using CRC32 check method. When the device receives a command to perform integrity check, it generates the first to-be-verified information from the main partition information using CRC32 check method. The device then compares said first to-be-verified information to the first verified information, and if the two match, then it confirms that the main partition information is of integrity.

In another embodiment, when the device is starting up, it receives a command to perform integrity check, and it checks data integrity of the backup partition information after checking data integrity of the main partition information. It generates the second to-be-verified information from the backup partition information using CRC32 check method. It then compares the second to-be-verified information to the stored second verified information in correspondence to the backup partition information, and if the two do not match, then it confirms that the backup partition information is lack of integrity.

If the triggering condition for integrity check is met upon receiving a command to perform integrity check, such command to perform integrity check may be generated by a user selecting from options of whether to perform the check upon device starting up. When the user selects to perform the check, the device receives the command to perform integrity check.

In some embodiments, the backup partition information may be generated at the same time when the main partition information is generated, or it may be generated when the device starts up the first time after a system is newly installed.

If the backup partition information is generated when the device starts up the first time after a system is newly installed, in one embodiment, a method as follows may be used.

When the device starts up, whether the device contains a start up label is checked; if the device doesn't contain a start up label, then whether the triggering condition for integrity check is met is checked. The start up label therein indicates the device starts up the first time after a system is newly installed.

If the device contains a start up label, the device starts up using said main partition information, backup partition information is generated according to the main partition information, and the start up label in the device is deleted.

In some embodiments, the sequence of starting the device using said main partition information, generating backup partition information according to the main partition information, and deleting the start up label in the device is not in time sequence. It may start the device using said main partition information, then generate backup partition information according to the main partition information, and then delete the start up label in the device. It also may generate backup partition information according to the main partition information, then start the device using said main partition information, and then delete the start up label in the device. It also may delete the start up label in the device, then start the device using said main partition information, and then generate backup partition information according to the main partition information. It may also perform the three operations concurrently.

The start up label may be stored in a fixed location in the device, and may be generated by a code or may be a fixed value.

In one embodiment, when generating or updating main partition information, the device generates said start up label.

For example, when the backup partition information is generated together with the main partition information, after the system is reinstalled, the device generates a start up label. When starting up the device for the first time, because the device contains a start up label, it starts up using the main partition information, and deletes the start up label.

In another embodiment, when the backup partition information is generated upon the first start up of a newly installed system, after the system is reinstalled, the device generates a start up label. When starting up the device for the first time, because the device contains a start up label, it generates the backup partition information and starts up using the main partition information, and deletes the start up label.

In another embodiment, when the backup partition information is generated together with the main partition information, when the device updates the main partition information, the device generates a start up label. When starting up the device next time, because the device contains a start up label, it starts up using the main partition information, and deletes the start up label.

In another embodiment, when the backup partition information is generated upon the first start up of a newly installed system, when the device updates the main partition information, the device generates a start up label. When starting up the device for the first time, because the device contains a start up label, it generates backup partition information and starts up using the main partition information, and deletes the start up label.

Figure 3:
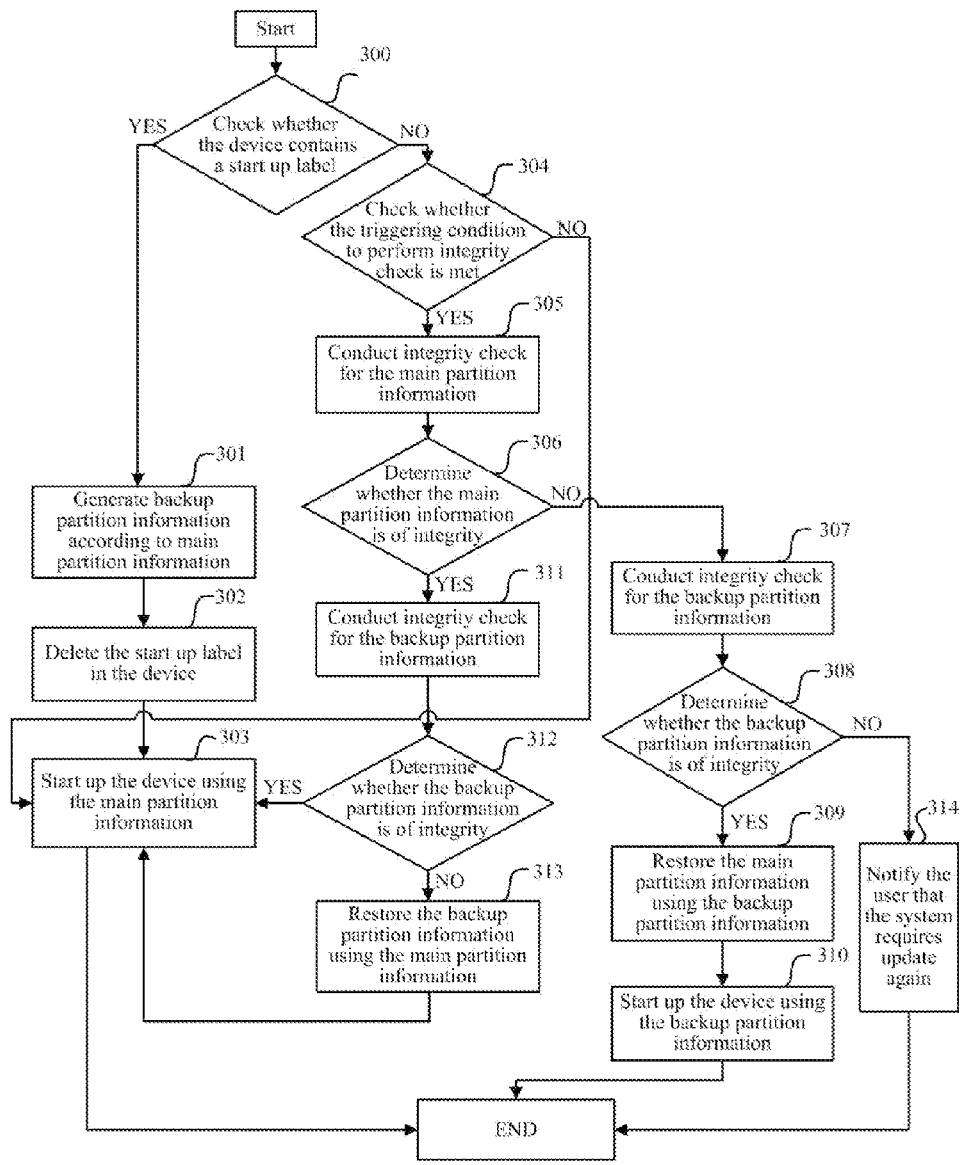
FIG. 3 is a flow chart of a method of starting up a device according to an embodiment.

As shown in FIG. 3, in one embodiment, the method of starting up the device includes the following operations.

Operation 300: check whether the device contains a start up label; if so, perform Operation 301; otherwise perform Operation 304.

Operation 301: generate backup partition information according to main partition information.

Operation 302: delete the start up label in the device.

Operation 303: start up the device using the main partition information.

Operation 304: check whether the triggering condition to perform integrity check is met. If so, perform Operation 305; otherwise, perform Operation 303.

Operation 305: conduct integrity check for the main partition information.

Operation 306: determine whether the main partition information is of integrity. If yes, perform Operation 311; otherwise perform Operation 307.

Operation 307: conduct integrity check for the backup partition information.

Operation 308: determine whether the backup partition information is of integrity. If yes, perform Operation 309; otherwise perform Operation 314.

Operation 309: restore the main partition information using the backup partition information.

Operation 310: start up the device using the backup partition information.

Operation 311: conduct integrity check for the backup partition information.

Operation 312: determine whether the backup partition information is of integrity. If yes, perform Operation 303; otherwise perform Operation 313.

Operation 313: restore the backup partition information using the main partition information, and perform Operation 303.

Operation 314: notify the user that the system requires update again.

Based up on the same inventive idea, some embodiments herein provide a device. Because the device in FIG. 4 entails a method which is the method of starting up a device disclosed herein in some embodiments, references may be made to such method and embodiments. To avoid repetition, such references are not discussed again here.

Figure 4:
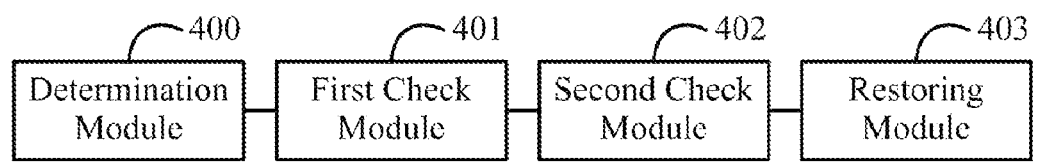
FIG. 4 is a structural diagram of a device according to an embodiment.

As shown in FIG. 4, in one embodiment the device includes:

One or more processors; and

A storage device.

The storage device stores one or more computer readable program codes, and the processors are configured to perform such computer readable program codes to perform the functions of following modules.

A Determination Module 400 is configured to determine whether the triggering condition to perform integrity check is met when the device is starting up.

A First Check Module 401 is configured to conduct integrity check for the main partition information when the Determination Module 400 determines that triggering condition to perform integrity check is met;

A Second Check Module 402 is configured to conduct integrity check for the backup partition information when the First Check Module 401 determines the main partition information is lack of integrity;

A Restoring Module 403 is configured to start up the device using the backup partition information and restores the main partition information using the backup partition information when the Second Check Module 402 determines that the backup partition information is of data integrity.

In one embodiment, the First Check Module 401 is further configured to:

After confirming that the main partition information is of integrity, conduct integrity check for the backup partition information; after confirming the backup partition information is lack of integrity, start up the device using the main partition information, and restore the backup partition information using the main partition information.

In one embodiment, the Determining Module 400 is configured specifically to identify one of the following conditions as triggering condition to perform integrity check:

The number of times of device starting up reaches a preset threshold;

A command to perform integrity check is received.

In one embodiment, the Determining Module 400 is further configured to:

Determine whether the device contains a start up label;

After determining the device doesn't contain a start up label, determine whether the triggering condition to perform integrity check is met;

The start up label indicates the first time device starting up after a system is newly installed.

In one embodiment, the Determining Module 400 is further configured to:

When determining the device contains a start up label, start up the device using the main partition information, and delete the start up label in the storage device.

In one embodiment, the Determining Module 400 is further configured to:

When determining the device contains a start up label, start up the device using the main partition information, generate backup partition information using the main partition information, and delete the start up label in the storage device.

In one embodiment, the Determining Module 400 is further configured to:

When generating or updating main partition information, add the start up label to the storage device.

In one embodiment, the First Check Module 401 is specifically configured to:

Compare the first to-be-verified information determined from the main partition information to the stored first verified information in correspondence to the main partition information. If the first to-be-verified information matches the first verified information, confirm that the main partition information is of integrity; if the first to-be-verified information does not match the first verified information, confirm the main partition information is lack of integrity;

Said first verified information in correspondence to the main partition information is stored when said main partition information is generated;

In one embodiment, the Second Check Module 402 is specifically configured to:

Compare the second to-be-verified information determined from the backup partition information to the stored second verified information in correspondence to the backup partition information. If the second to-be-verified information matches the second verified information, confirm that the backup partition information is of integrity; if the second to-be-verified information does not match the second verified information, confirm that the backup partition information is lack of integrity.

Said second verified information in correspondence to the backup partition information is stored when said backup partition information is generated.

The embodiments herein further provide a computer readable medium, which may be computer readable medium in the storage devices in above embodiments, or may be standing alone computer readable medium not installed into electronic devices. The computer readable medium may store one or more programs, such programs may be performed by one or more processors to execute the methods in the embodiments as illustrated in FIGS. 2 and 3. The illustration of FIGS. 2 and 3 shows the details of the method, which is not repeated here.

From above it shows that, some embodiments herein discloses the following:

When starting up the device, determine whether the triggering condition of integrity check is met;

If the triggering condition is met, conduct integrity check for the main partition information;

After confirming that main partition information is lack of integrity, conduct integrity check for the backup partition information;

After confirming the integrity of the backup partition information, restore the main partition information using the backup partition information, and start up the device using the backup partition information.

Some embodiments herein disclose a method to restore the main and backup partition information of a device, which may ensure the data integrity of the main and backup partition information, and may enhance the performance of the device.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of starting up a device, the method comprising:
   during start up of the device, determining that the device does not contain a start up label, and subsequently determining whether a triggering condition of an integrity check is met, the start up label indicating a first time starting up the device after a system is newly installed in the device;
   when the triggering condition is met, conducting the integrity check for main partition information;
   after confirming that the main partition information lacks integrity, conducting an integrity check for backup partition information; and
   after confirming that the backup partition information has integrity, starting up the device using the backup partition information, and restoring the main partition information using the backup partition information.

2. The method of claim 1, wherein after conducting the integrity check for the main partition information, the method further comprises:
   after confirming that the main partition information has integrity, conducting the integrity check for the backup partition information; and
   after confirming the backup partition information lacks integrity, starting up the device using the main partition information, and restoring the backup partition information using the main partition information.

3. The method of claim 1, wherein the triggering condition for the integrity check is met when:
   a number of times of device start ups reaches a preset threshold; or
   a command to perform the integrity check is received.

4. The method of claim 1, further comprising:
   when the device contains the start up label, starting up the device using the main partition information, and deleting the start up label; or
   when the device contains the start up label, starting up the device using the main partition information, generating the backup partition information using the main partition information, and deleting the start up label.

5. The method of claim 1, further comprising:
   when generating or updating the main partition information, adding the start up label to the device.

6. The method of claim 1, wherein conducting the integrity check for the main partition information comprises:
   comparing a first to-be-verified information determined from the main partition information to a stored first verified information corresponding to the main partition information; and
   when the first to-be-verified information matches the first verified information, confirming that the main partition information has integrity;
   when the first to-be-verified information does not match the first verified information, confirming that the main partition information lacks integrity;
   wherein said first verified information corresponding to the main partition information is stored when the main partition information is generated;
   wherein conducting the integrity check for the backup partition information comprises:
   comparing a second to-be-verified information determined from the backup partition information to a stored second verified information corresponding to the backup partition information; and
   when the second to-be-verified information matches the second verified information, confirming that the backup partition information has integrity;
   when the second to-be-verified information does not match the second verified information, confirming that the backup partition information lacks integrity;
   wherein said second verified information corresponding to the backup partition information is stored when the backup partition information is generated.

7. A device, comprising:
   one or more processors; and
   a storage device, the storage device storing one or more computer readable program codes, and the one or more processors executing the computer readable program codes to perform:
   during start up of the device, determining whether the device contains a start up label, and when the device does not contain the start up label, determining whether a triggering condition of an integrity check is met, the start up label indicating a first time starting up the device after a system is newly installed in the device;
   when the triggering condition is met, conducting the integrity check for main partition information;
   after confirming that the main partition information lacks integrity, conducting an integrity check for backup partition information; and
   after confirming that the backup partition information has integrity, starting up the device using the backup partition information, and restoring the main partition information using the backup partition information.

8. The device of claim 7, wherein after conducting the integrity check for the main partition information, the one or more computer readable program codes are further executed to perform:
   after confirming that the main partition information has integrity, conducting the integrity check for the backup partition information; and
   after confirming the backup partition information lacks integrity, starting up the device using the main partition information, and restoring the backup partition information using the main partition information.

9. The device of claim 7, wherein the triggering condition for the integrity check is met when:
   a number of times of device start ups reaches a preset threshold; or
   a command to perform the integrity check is received.

10. The device of claim 7, wherein the one or more computer readable program codes are further executed to perform:
   when the device contains the start up label, starting up the device using the main partition information, and deleting the start up label; or
   when the device contains the start up label, starting up the device using the main partition information, generating the backup partition information using the main partition information, and deleting the start up label.

11. The device of claim 7, wherein the one or more computer readable program codes are further executed to perform:
   when generating or updating the main partition information, adding the start up label to the device.

12. The device of claim 7, wherein conducting the integrity check for the main partition information comprises:
   comparing a first to-be-verified information determined from the main partition information to a stored first verified information corresponding to the main partition information; and
   when the first to-be-verified information matches the first verified information, confirming that the main partition information has integrity;
   when the first to-be-verified information does not match the first verified information, confirming that the main partition information lacks integrity;
   wherein said first verified information corresponding to the main partition information is stored when the main partition information is generated;
   wherein conducting the integrity check for the backup partition information comprises:
   comparing a second to-be-verified information determined from the backup partition information to a stored second verified information corresponding to the backup partition information; and
   when the second to-be-verified information matches the second verified information, confirming that the backup partition information has integrity;
   when the second to-be-verified information does not match the second verified information, confirming that the backup partition information lacks integrity;
   wherein said second verified information corresponding to the backup partition information is stored when the backup partition information is generated.

13. A non-transitory machine-readable storage medium which stores one or more programs, said one or more programs, when performed by a device, allowing the device to perform:
   during start up of the device, determining whether the device contains a start up label, and when the device does not contain the start up label, determining whether a triggering condition of an integrity check is met, the start up label indicating a first time starting up the device after a system is newly installed in the device;
   when the triggering condition is met, conducting the integrity check for main partition information;
   after confirming that the main partition information lacks integrity, conducting an integrity check for backup partition information; and
   after confirming that the backup partition information has integrity, starting up the device using the backup partition information, and restoring the main partition information using the backup partition information.

14. The non-transitory machine-readable storage medium of claim 13, wherein after conducting the integrity check for the main partition information, the one or more programs are further executed to perform:
   after confirming that the main partition information has integrity, conducting an integrity check for the backup partition information; and
   after confirming the backup partition information lacks integrity, starting up the device using the main partition information, and restoring the backup partition information using the main partition information.

15. The non-transitory machine-readable storage medium of claim 13, wherein the triggering condition for integrity check is met when:
   a number of times of device start ups reaches a preset threshold; or
   a command to perform the integrity check is received.

16. The non-transitory machine-readable storage medium of claim 13, wherein during device starting up, before determining whether the triggering condition for the integrity check is met, the one or more programs are further executed to perform:
   when the device contains the start up label, starting up the device using the main partition information, and deleting the start up label; or
   when the device contains the start up label, starting up the device using the main partition information, generating the backup partition information using the main partition information, and deleting the start up label.

17. The non-transitory machine-readable storage medium of claim 13, wherein the one or more programs are further executed to perform:
   when generating or updating the main partition information, adding the start up label to the device.

18. The non-transitory machine-readable storage medium of claim 13, wherein conducting the integrity check for the main partition information comprises:
   comparing a first to-be-verified information determined from the main partition information to a stored first verified information corresponding to the main partition information; and
   when the first to-be-verified information matches the first verified information, confirming that the main partition information has integrity;
   when the first to-be-verified information does not match the first verified information, confirming that the main partition information lacks integrity;
   wherein said first verified information corresponding to the main partition information is stored when the main partition information is generated;
   wherein the conducting integrity check for the backup partition information comprises:

comparing a second to-be-verified information determined from the backup partition information to a stored second verified information corresponding to the backup partition information; and when the second to-be-verified information matches the second verified information, confirming that the backup partition information has integrity;

when the second to-be-verified information does not match the second verified information, confirming that the backup partition information lacks integrity;

wherein said second verified information corresponding to the backup partition information is stored when the backup partition information is generated.

\* \* \* \* \*